(12) United States Patent
Komatsu et al.

(10) Patent No.: US 7,139,140 B2
(45) Date of Patent: Nov. 21, 2006

(54) METHOD AND APPARATUS OF MAGNETICALLY TRANSFERRING INFORMATION SIGNAL FROM MASTER MEDIUM TO SLAVE MEDIUM

(75) Inventors: Kazunori Komatsu, Kanagawa (JP); Masakazu Nishikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 488 days.

(21) Appl. No.: 10/078,535

(22) Filed: Feb. 21, 2002

(65) Prior Publication Data

US 2002/0163747 A1 Nov. 7, 2002

(30) Foreign Application Priority Data

Feb. 23, 2001 (JP) .............................. 2001-047809

(51) Int. Cl.
 *G11B 5/86* (2006.01)
(52) U.S. Cl. ....................................................... 360/17
(58) Field of Classification Search .................. 360/15, 360/16, 17
See application file for complete search history.

(56) References Cited

U.S. PATENT DOCUMENTS 5,229,983 A * 7/1993 Kawamura et al. ...... 369/13.19
6,347,016 B1 * 2/2002 Ishida et al. ................... 360/17
6,433,944 B1 * 8/2002 Nagao et al. .................. 360/16
6,570,724 B1 * 5/2003 Komatsu et al. .............. 360/17

FOREIGN PATENT DOCUMENTS

JP 57138061 A * 8/1982

* cited by examiner

*Primary Examiner*—Wayne Young
*Assistant Examiner*—Daniell L. Negrón
(74) *Attorney, Agent, or Firm*—Sughrue Mion, PLLC

(57) ABSTRACT

When executing a magnetic transfer by bringing a master medium and a slave medium into close contact with each other and applying a transferring magnetic field, a permitted limit of the application direction of the transferring magnetic field is defined so that magnetic patterns can be accurately transferred. A slave medium 2 is previously initial DC magnetized in a track direction by applying a magnetic field to the slave medium in the track direction of a slave surface, and when executing a magnetic transfer by bringing the master medium 3 and the slave medium 2 into close contact with each other and applying the transferring magnetic field in the track direction of the slave surface, the application angle α of the transferring magnetic field is defined within a range of ±30° in a vertical direction with respect to the slave surface. Furthermore, the application angle of the transferring magnetic field is defined within a range of ±30° with respect to the track direction on a plane parallel to the slave surface.

13 Claims, 3 Drawing Sheets

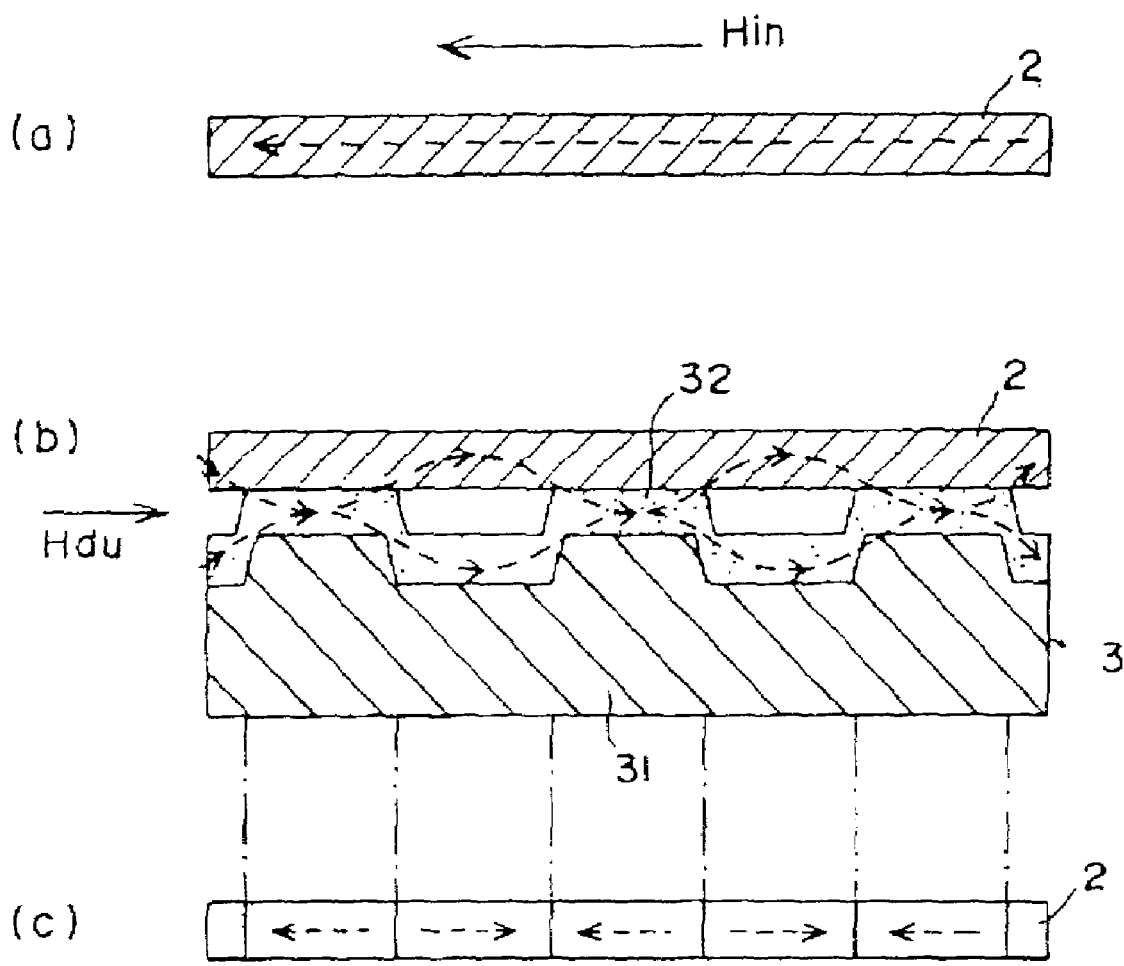

METHOD AND APPARATUS OF MAGNETICALLY TRANSFERRING INFORMATION SIGNAL FROM MASTER MEDIUM TO SLAVE MEDIUM

TECHNICAL FIELD

The present invention relates to a method and an apparatus for magnetically transferring magnetic information signals held in a master medium to a slave medium.

BACKGROUND OF THE INVENTION

The magnetic transfer method is one for magnetically transferring magnetic patterns corresponding to magnetic information (for example, servo signals) held in a master medium to a slave medium by applying transferring magnetic field in a state where the master medium and the slave medium are in close contact with each other. This magnetic transfer method is disclosed, for example, in Japanese Unexamined Patent Publication Nos. 63(1988)-183623, 10(1998)-40544, 10(1998)-269566 and the like.

Moreover, transferring magnetic field is applied by arranging a magnetic field generating means such as an electromagnet device or a permanent magnet device to a single side or both sides of the slave medium in a state where the single side or both sides of the slave medium and the master medium are in close contact with each other. In this time, if the slave medium and the master medium that are in close contact with each other, or the magnetic field is relatively rotated, magnetic patterns are transferred to a track on a circumference of the slave medium of disk shape.

However, in said magnetic transfer method, in order to enhance transfer accuracy by transferring magnetic patterns accurately corresponding to transfer information, in which a magnetic layer of uneven patterns was formed on an information bearing surface of the master medium to record them therein, to a recording surface of the slave medium, a transferring magnetic field should be accurately applied in a track direction in a state where the close contact property between an information bearing surface of the master medium and a slave surface of the slave medium is assured.

However, it is difficult that magnetic field generated by an actual magnetic field generating means is made to be parallel to a track direction and a slave surface in a plane direction and a vertical direction from an inner circumference portion to a whole outer circumference portion of the slave medium, and is made to be offset due to various factors. If the offset of the application direction of such transferring magnetic field becomes greater, the magnetic transfer of high accuracy does not executed because the magnetic patterns of such area are scattered. Thus, when the transfer information is servo signals, a satisfactory tracking function cannot be obtained and reliability of reproducing the information is lowered.

SUMMARY OF THE INVENTION

The present invention was made with the above-described problems in mind. The object of the present invention is to provide a method and an apparatus for magnetically transferring magnetic information signals held in a master medium to a slave medium in a state where the master medium and the slave medium are in close contact with each other, which is capable of executing accurate transfer of the magnetic patterns by defining the allowable range of the application direction of the transferring magnetic field.

According to one aspect of the present invention, there is provided a magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of: applying a magnetic field to the slave medium in a track direction of a slave surface to initial DC magnetize the slave medium previously in the track direction; bringing the master medium and the slave medium into close contact with each other; and applying the transferring magnetic field in the track direction of a slave surface to execute a magnetic transfer, wherein an application angle of the transferring magnetic field is within a range of ±30° in a vertical direction with respect to the slave surface.

According to the other aspect of the present invention, there is provided a magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of: applying a magnetic field to the slave medium in a track direction of a slave surface to initial DC magnetize the slave medium previously in the track direction; bringing the master medium and the slave medium into close contact with each other; and applying the transferring magnetic field in the track direction of a slave surface to execute a magnetic transfer, wherein an application angle of the transferring magnetic field is within a range of ±30° with respect to the track direction on a plane parallel to the slave.

According to another aspect of the present invention, there is provided a magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of: applying a magnetic field to the slave medium in a track direction of a slave surface to initial DC magnetize the slave medium previously in the track direction; bringing the master medium and the slave medium into close contact with each other; and applying the transferring magnetic field in the track direction of a slave surface to execute a magnetic transfer, wherein a sum of absolute values of an application angle of the transferring magnetic field in a direction vertical to the slave surface and an application angle of the transferring magnetic field with respect to the track direction on a plane parallel to the slave surface is within 30°.

According to another aspect of the present invention, there is provide a magnetic transfer apparatus for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, which comprises: a magnetic field generating means for applying the transferring magnetic field to the slave medium in close contact with the master medium in a track direction, wherein an application angle of the transferring magnetic field by the magnetic field generating means is within a range of ±30° in a vertical direction with respect to a slave surface and is within a range of ±30° with respect to the track direction on a plane parallel to the slave surface.

As the magnetic field generating means for applying the transferring magnetic field, an electromagnet device or a permanent magnet device can be used. However, the electromagnet device is preferably used because the conditions such as the magnetic field intensity and the like can be more easily set and regulated.

There are a case that a single surface sequential transfer is executed by bringing the master medium into close contact with the single surface of the slave medium and a case that a both surfaces simultaneous transfer is executed by bringing the master mediums into close contact with both surfaces of the slave medium. At that time, the master medium is brought into close contact with the single surface or both surfaces of the slave medium and a magnetic field generating means is arranged in one side or both sides thereof to apply the transferring magnetic field thereto. The magnetic field generating means generates the magnetic field parallel to the track direction in a range extending in a radial direction of the slave medium, and the slave medium and the master medium in close contact with each other or the magnetic field generating means is relatively rotated, so that the magnetic pattern can be transferred to the whole surface of the slave medium having a disk shape.

It is preferable that the slave medium is a disk-shaped magnetic recording medium such as a, hard disk, a flexible disk and the like. It is also preferable that the magnetic layer of the master medium is magnetically transferred with the coercive force (Hcm) of 48 kA/m (600 Oe) or less.

It is preferable that in the above magnetic transfer method, fundamentally, the initial DC magnetization for DC magnetizing the slave medium in the track direction is first executed and the slave medium is brought into close contact with the master medium in which the magnetic layer is formed on the micro uneven patterns corresponding to the information to be transferred, and then the transferring magnetic field is applied in a direction reverse to the initial DC magnetization direction of the slave surface to execute the magnetic transfer. It is preferable that the information is a servo signal.

The initial magnetization of the slave medium is executed by generating the magnetic field at a portion of the track direction, and rotating the slave medium or the magnetic field in the track direction, wherein the magnetic field has magnetic field intensity distribution having portions of the magnetic field intensity not less than the coercive force of the slave medium in at least one position of the track direction. Also, it is preferable to generate the magnetic field at a portion of the track direction, of which magnetic field intensity distribution has the portions of the magnetic field intensity not less than the coercive force of the slave medium only in a single directional position of the track direction and has the magnetic field intensity in the reverse direction less than the coercive force of the slave medium in the whole positions of the track direction.

Also, it is preferable that application of the transferring magnetic field is executed by generating the magnetic field at a portion of the track direction, and rotating the master medium for the magnetic transfer and the slave medium initially DC magnetized in close contact with each other, or the magnetic field in the track direction, wherein the magnetic field has magnetic field intensity distribution that the magnetic field intensity greater than the maximum value of the range of the optimum transferring magnetic field intensity does not exist in any position of the track direction, portion to be the magnetic field intensity within the range of the optimum transferring magnetic field intensity exists in at least one position in the single track direction, and the magnetic field intensity in the reverse track direction is less than the minimum value of the range of the optimum transferring magnetic field intensity in the whole positions of the track direction. The range of the optimum transferring magnetic field intensity is 0.6~1.3 times the coercive force (Hcs) of the slave medium.

According to the aforementioned present invention, because when executing the magnetic transfer, the application angle of the transferring magnetic field is within a range of ±30° in a vertical direction with respect to the slave surface, or the application angle of the transferring magnetic field is within a range of ±30° with respect to the track direction on a plane parallel to the slave surface, or sum of absolute values of an application angle of the transferring magnetic field in a direction vertical to the slave surface and an application angle of the transferring magnetic field with respect to the track direction on a plane parallel to the slave surface is within 30°, an accurate transfer of the magnetic patterns can be executed with homogeneous properties on the whole surface of the slave medium and can assure an excellent tracking function in a case of servo signals to improve reliability thereof.

In constructing the magnetic transfer device, by regulating the application angle of the magnetic field for magnetic transfer within an allowable range as described above, an excellent magnetic transfer can be executed, so that design of accuracy in assembly of the whole device, intensity and distribution of the magnetic field in the magnetic field generating means and the like is easily performed.

BRIEF DESCRIPTION OF THE DRAWINGS

The embodiments of the present invention will be explained with reference to the accompanying drawings, in which:

FIG. 5 is a schematic view showing principal steps of the magnetic transfer method according of the present invention.

DETAILED DESCRIPTION OF THE INVENTION

Hereinbelow, description will be given for embodiments of the present invention in detail with reference to the accompanying drawings.

Figure 1:
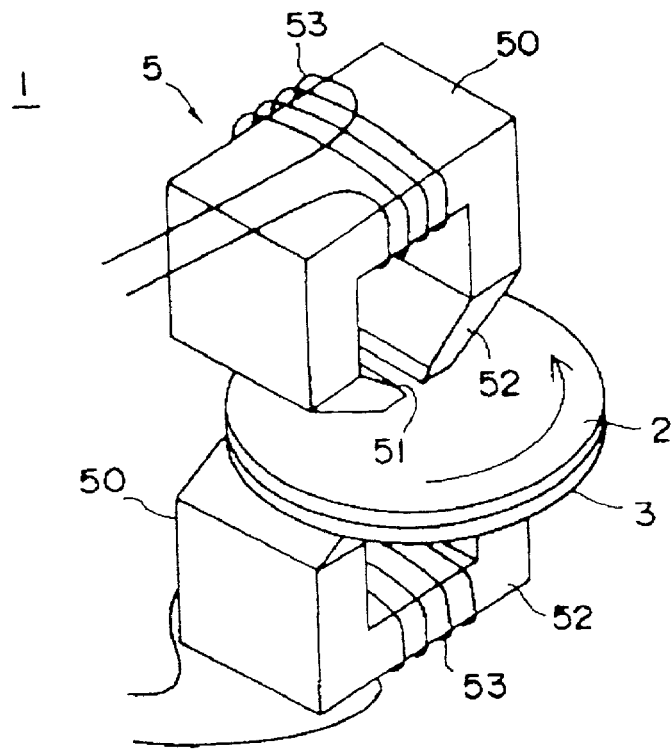
FIG. 1 is a perspective view showing main parts of a magnetic transfer apparatus for executing a magnetic transfer method according to an embodiment of the present invention.
Figure 2:
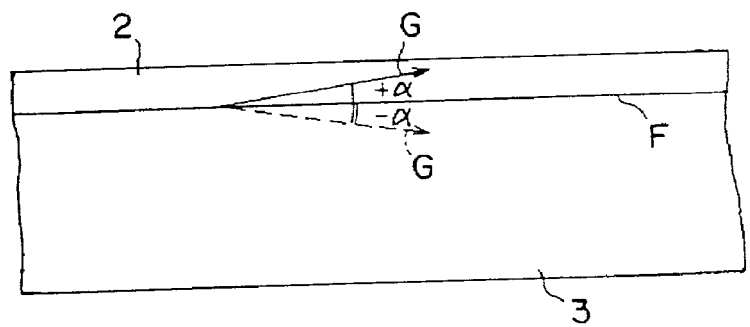
FIG. 2 is a front view showing a first definition of application angle of transferring magnetic field.
Figure 3:
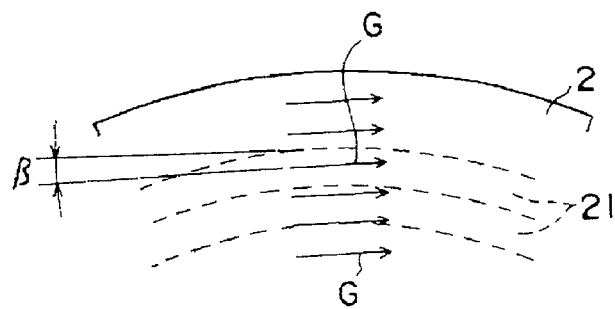
FIG. 3 is a plan view showing a second definition of application angle of transferring magnetic field.
Figure 4:
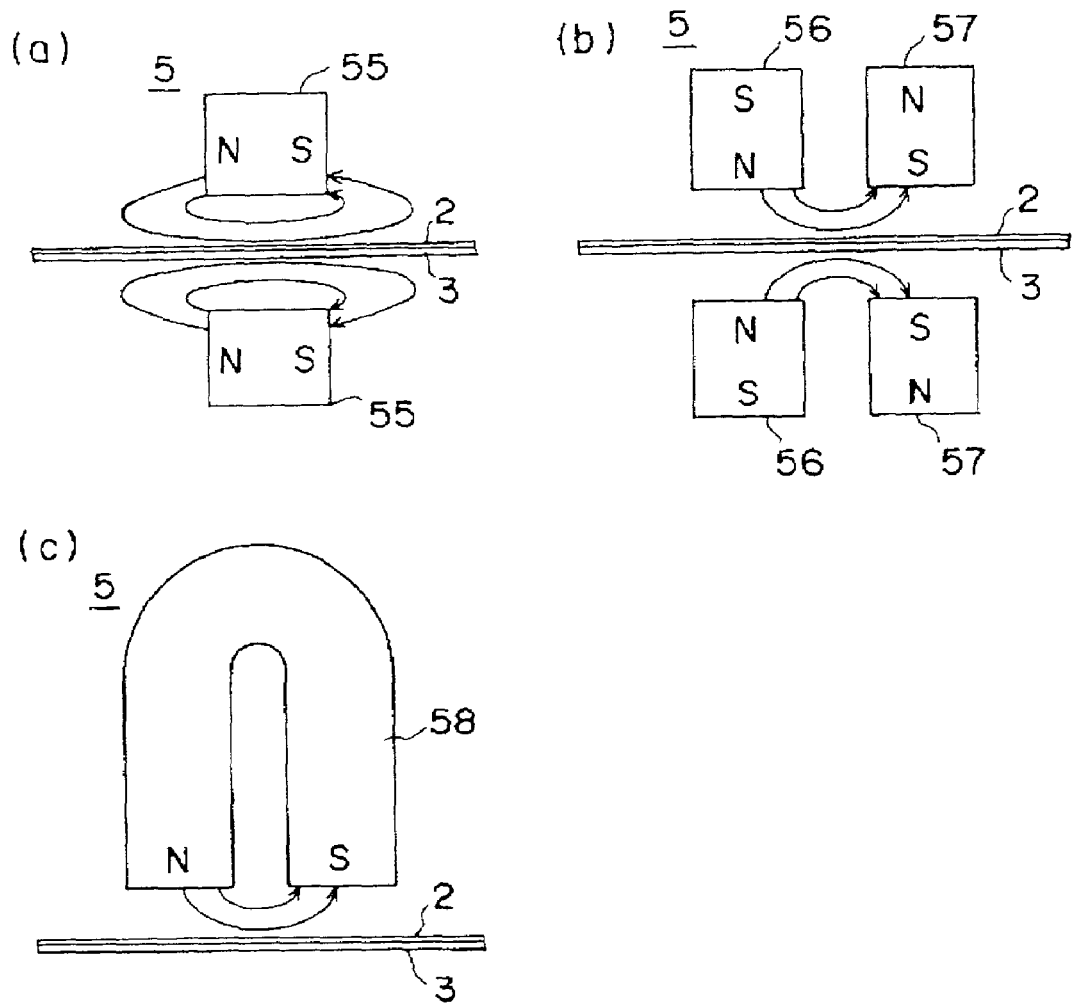
FIG. 4 is a schematic view showing another embodiment of a magnetic field generating means.

FIG. 1 is a perspective view showing main parts of a magnetic transfer apparatus for executing a magnetic transfer method according to an embodiment of the present invention. FIGS. 2 and 3 are views showing definitions of the application angle of transferring magnetic field, FIG. 4 is a schematic view showing another embodiment of a magnetic field generating means, and FIG. 5 is a schematic view showing principal steps of the magnetic transfer method according of the present invention. Note that each of the figures is a schematic view, and that dimension of each parts or the like shown therein is different from an actual dimension.

In the magnetic transfer apparatus of FIG. 1, during the magnetic transfer, a slave surface (magnetic recording surface) of a slave medium 2 (magnetic recording medium) is allowed to get in contact with an information bearing surface of a master medium 3 so that the slave medium and the master medium are in close contact with each other with predetermined pressing force after initial DC magnetization to be described later is executed. In this close contact state between the slave medium 2 and the master medium 3, a transferring magnetic field is applied to them by a magnetic field generating means. Thus, magnetic patterns such as serv0o signal of the master medium 3 are transferred to the slave medium 2 to be recorded therein.

The slave medium 2 is a disk type magnetic recording medium such as a hard disk, a flexible disk and the like which a magnetic recording layer is formed on both surfaces or one surface thereof. A cleaning process for removing micro protrusions or adhering particles on a surface of the slave medium by a grind head, abrasive substance and the like is executed, if desired, before the slave medium 2 and the master medium 3 are in close contact with each other.

Moreover, the slave medium 2 is allowed to previously undergo initial magnetization. This initial magnetization generates a magnetic field of magnetic field intensity distribution not less than the coercive force Hcs of the slave medium 2 in at least one place thereof in a tracking direction. Preferably, such initial magnetization generates a magnetic field of magnetic field intensity distribution which is not less than the coercive force Hcs of the slave medium 2 only in the tracking direction and is less than the coercive force of the slave medium 2 in a direction reverse to the tracking direction in a portion of the tracking direction. Thus, the initial magnetization (DC demagnetization) of whole track is executed by rotating the slave medium 2 or the magnetic field in the tracking direction.

The master medium 3 is formed into a disk shape. On one surface of the master medium 3, a transfer-information bearing surface on which micro uneven patterns due to a magnetic layer 32 are formed is formed (referring to FIG. 5). The other surface of the master medium contrary to one surface is held to a close contact means (not shown) to be brought into close contact with a conveyed slave medium 2. As shown, there are a single surface sequential transfer in which the master medium 3 is brought into close contact with one surface of the slave medium 2 and a both surface simultaneous transfer in which the mater medium 3 is respectively brought into close contact with both surfaces of the slave medium 2. A cleaning process for removing micro particles adhered to the master medium 3 is performed, if necessary, before the master medium 3 and the slave medium 3 are in close contact with each other.

In a magnetic field generating means 5, electromagnet devices 50, 50, in which a coil 53 is wound on a core 52 having a gap 51 extending to the radial direction of the slave medium 2 and the master medium 3 held on a close contact means, are arranged on upper and lower sides of the mediums 2, 3. In this state, the magnetic field generating means 5 applies transferring magnetic field having magnetic lines G parallel to the tracking direction to the mediums 2, 3 in the same direction over and under the mediums 2, 3.

During the magnetic field application, a transferring magnetic field is applied by the magnetic field generating means and transfer information of the master medium 3 is magnetically transferred and recorded to a slave surface of the slave medium 2 while rotating integrally the slave medium 2 and the master medium 3. It is preferable that the magnetic field generating means 5 is rotatably mounted.

The transferring magnetic field generates the magnetic field at a portion of the track direction, wherein the magnetic field has magnetic field intensity distribution that the magnetic field intensity greater than the maximum value of the range (0.6~1.3 times the coercive force Hcs of the slave medium) of the optimum transferring magnetic field intensity does not exist in any position of the track direction, and portion to be the magnetic field intensity within the range of the optimum transferring magnetic field intensity exists in at least one position in the single track direction, and the magnetic field intensity in the reverse track direction is less than the minimum value of the range of the optimum transferring magnetic field intensity in the whole positions of the track direction.

When executing the magnetic transfer, the application angle of the transferring magnetic field by the magnetic field generating means 5 is within ±30° in the vertical direction with respect to the slave surface of the slave medium 2. That is, when seen from front as shown in FIG. 2, an angle α between an application angle of the lines G of magnetic force of the transferring magnetic field generated in portions where the magnetic field is applied by the magnetic field generating means 5 and the slave surface F of the slave medium 2 in close contact with the master medium 3 is defined to be within ±30°. Also, in the figure, the upward angle α indicates a plus direction.

Also, the application angle of the transferring magnetic field is within ±30° with respect to the track direction on a plane parallel to the slave surface of the slave medium 2. That is, when seen from a plane direction as shown in FIG. 3, an angle β between the application direction of lines G of the transferring magnetic field generated in portions where the magnetic field is applied by the magnetic field generating means 5 and a tangential direction of a circumferential track on the slave surface of the slave medium 2 is defined to be within ±30°. Also, in the figure, the outward angle β indicates a plus direction.

Also, in the application angle of the transferring magnetic field, sum of the absolute values of the angle α in the vertical direction and the angle β in the track direction is defined to be within 30°. The reason for such definition about the application angles of the transferring magnetic field will be described later.

The magnetic field generating means 5 may be arranged in only one side. Also, in another embodiment, the electromagnet device or the permanent magnet device for generating the transferring magnetic field as shown in FIG. 4(A)~(C) may be arranged in only one side or both sides as the magnetic field generating means 5.

The magnetic field generating means 5 shown in FIG. 4(A) is so constructed that both side portions, parallel to the slave surface, of one electromagnet 55 (or permanent magnet) extending in the radial direction of the slave medium 2 are made of opposite magnetic poles, to generate the magnetic field in the track direction. The magnetic field generating means 5 shown in FIG. 4(B) is so constructed that the end surfaces, toward the slave surface, of two parallel electromagnets 56, 57 (or permanent magnets) extending in the radial direction of the slave medium and spaced from each other at a predetermined gap are made of opposite magnetic poles, to generate the magnetic field in the track direction. The magnetic field generating means 5 shown in FIG. 4(C) is so constructed that two parallel end surfaces, toward the slave surface, of the permanent magnet 58 (or electromagnet) having U shaped cross-sections and extending in the radial direction are made of opposite magnetic poles, to generate the magnetic field in the track direction.

Also, in the magnetic field generating means 5 of the respective embodiments as described above, the angle α in the vertical direction (FIG. 2) and the angle β in the track direction (FIG. 3) in the application angles of the transferring magnetic field are defined to be within +−30°, respectively, and the sum of the absolute values of them is defined to be within 30°.

Next, FIG. 5 is a schematic view showing basic patterns of the magnetic transfer. FIG. 5(A) shows a step of applying the magnetic field in one direction to initially D.C. magnetize the slave medium 2, FIG. 5(B) shows a step of bring the master medium 3 and the slave medium 2 into close contact with each other and then applying magnetic field in a direction reverse to the one direction, and FIG. 5(C) shows a state after the magnetic transfer, respectively.

First, as shown in FIG. 5(A), the initial magnetic field Hin is applied to the slave medium 2 in one track direction to previously execute the initial magnetization (DC demagnetization). Then, as shown in FIG. 5(B), a slave surface (magnetic recording surface) of the slave medium 2 and an information bearing surface formed by coating micro uneven patterns on a substrate 31 of the master medium 3 with a magnetic layer 32 are in close contact with each other and then, the transferring magnetic field Hdu is applied to the slave medium 2 in a track direction reverse to the application direction of the initial magnetic direction, to thereby execute the magnetic transfer. As a result, as shown in FIG. 5(C), magnetic patterns are transferred and recorded on the slave surface (track) of the slave medium 2 according to the patterns of protrusions and recesses of the magnetic layer 32 on the information-bearing surface of the master medium 3.

Also, even when the uneven patterns on the substrate 31 of the master medium 3 are negative patterns having uneven shapes reverse to the positive patterns in FIG. 5, the same magnetic patterns can be transferred and recorded by changing the direction of the initial magnetic field Hin and the direction of the transferring magnetic field Hdu to be directions reverse to the aforementioned directions.

When the substrate 31 is made of ferromagnetic substance such as Ni and the like, the magnetic transfer can be performed by means of only the substrate 31, so that the magnetic layer 32 need not be coated thereon. However, an excellent magnetic transfer can be performed by providing a magnetic layer 32 having good transfer property. When the substrate 31 is made of nonmagnetic substance, the magnetic layer 32 needs to be provided. It is preferable that the magnetic layer 32 of the master medium 3 is a soft magnetic layer having a coercive force Hcm of 48 kA/m (600 Oe) or less.

Nickel, silicon, quartz plate, glass, aluminum, alloy, ceramics, synthetic resin and the like are used as the substrate 31 of the master medium 3. The uneven patterns are formed with a stamper method, a photo-fabrication method and the like.

In the stamper method, photo-resist is formed on a glass plate (or quartz plate) having an even surface by a spin-coating and the like, a laser light (or electron beam) modulated according to the servo signal is irradiated on the glass plate while rotating the glass plate, and the whole photo-resist is exposed and thus predetermined patterns, for example, patterns corresponding to the servo signal and extending linearly in the radial direction on a line from a rotation center in each track, are formed in portions corresponding to the respective frames on the circumferences. Thereafter, the photo-resist is developed and the exposed portions are removed to obtain a disk having an uneven shape due to the photo-resist. Next, based on the uneven patterns on the surface of the disk, plating (electroforming) is performed on the surface to obtain a Ni substrate having positive uneven patterns, and then the Ni substrate is removed from the disk. This substrate may be used as a master medium in itself, or if necessary, a soft magnetic layer and a protective film may be coated on the uneven patterns to be used as a master medium.

Also, another plating may be performed on the disk again to make a second disk and another plating may be performed using the second disk to make a substrate having negative uneven patterns. Also, a plating may be performed on the second disk or resin solution may be brought into close contact with the second disk and a curing be performed to make a third disk, and then another plating may be performed on the third disk to obtain a substrate having positive uneven patterns.

On the other hand, after patterns due to the photo-resist are formed on the glass plate, holes are formed in the glass plate by etching and the photo-resist is removed to obtain a disk, and then a substrate may be made as described above.

Ni or Ni alloy can be used as metal materials of the substrate, and various metal film growth methods such as non-electrolysis plating, electroforming, sputtering, ion plating and the like can be used in the plating for making the substrate. It is preferable that the depth of the uneven patterns (height of the protrusions) on the substrate is within a range of 80 nm~800 nm and more preferably, within a range of 100 nm~600 nm. In a case of servo signals, the uneven patterns are formed long in the radial direction. For example, it is preferable that the length in the radial direction is 0.05~20 μm, and that the length in the circumferential direction is 0.05~5 μm. It is preferable that within these ranges, patterns longer in the radial direction are preferably selected as patterns for bearing information of the servo signals.

Formation of the magnetic layer 32 (soft magnetic layer) is executed by vacuum film growth method such as vacuum deposition method, sputtering method, ion-plating method, and plating method and the like. Co, Co alloy (CoNi, CoNiZr, CoNbTaZr and the like), Fe, Fe alloy (FeCo, FeCoNi, FeNiMo, FeAlSi, FeAl, FeTaN), Ni, Ni alloy (NiFe) can be used as magnetic material of the magnetic layer. Preferably, FeCo, FeCoNi can be used. It is preferable that the thickness of the magnetic layer is within a range of 50~500 nm and more preferably, within a range of 100~400 nm.

Also, it is preferable that a protective film such as DLC is formed on the magnetic layer and a lubricant layer may be formed. More preferably, diamond-like-carbon (DLC) film of 5~30 nm as protective film and the lubricant layer exist. Also, a contact-reinforcing layer such as Si may be formed between the magnetic layer and the protective film. The lubricant layer improves deterioration of durability such as generation of scars due to rubbing when correcting deviation generated during contacting with the slave medium.

A resin substrate may be manufactured using the above disk and the magnetic layer may be formed thereon to be the master medium. Acryl resins such as poly carbonate and poly methyl methacrylate, vinyl chloride resins such as poly vinyl chloride and vinyl chloride copolymer, epoxy resins, amorphous poly olefin, poly ester and the like can be used as the resin material of the resin substrate. From the point of view of moisture proof property, dimensions stability, price and the like, polycarbonate is preferable. Burrs on the formed product can be removed by means of vanishing or polishing. Also, ultraviolet curable resin, electron beam curable resin and the like may be formed on the disk by means of spin coating or bar coating. It is preferable that the height of the protrusions on the resin substrate is within a range of 50~100 nm and more preferably, within a range of 100~500 nm.

The magnetic layer is coated on the micro patterns on the surface of the resin substrate to obtain the master medium. The magnetic layer is formed from the magnetic material by means of vacuum film growth method such as vacuum deposition method, sputtering method, ion plating method, and plating method and the like.

On the other hand, in the photo-fabrication method, for example, photo-resist is coated on the flat surface of a flat substrate to form patterns according to information by exposure and development using a photo mask based on the patterns of the servo signals. Subsequently, the substrate is etched in according with patterns and formed with holes having a depth corresponding to the thickness of the magnetic layer by means of etching process. Subsequently, film growth material is coated up to the surface of the substrate in a thickness corresponding to the formed hole by means of vacuum film growth method such as vacuum deposition method, sputtering method, ion plating method, and plating method and the like. Subsequently, the surface thereof is polished to remove burrs and to flatten.

A magnetic recording medium having a disk shape such as a hard disk, high-density flexible disk and the like is used as the slave medium 2, and a coating type magnetic recording medium or a metal thin film type magnetic recording layer is formed as the magnetic recording layer. Co, Co alloy (CoPtCr, CoCr, CoPtCrTa, CoPtCrNbTa, CoCrB, CoNi and the like), Fe and Fe alloy (FeCo, FePt, FeCoNi) can be used as a magnetic material of the metal thin film type magnetic recording layer. This is preferable because more accurate transfer can be performed in case that the magnetic flux density is greater and the magnetic anisotropy is shown in the same direction as the application direction of the magnetic field. In order to provide the required magnetic anisotropy under (support member side) the magnetic material, it is preferable that nonmagnetic base layer is formed. The crystal structure and the lattice parameter should be mated with the magnetic layer. For that, Cr, CrTi, CoCr, CrTa, CrMo, NiAl, Ru and the like can be used.

Now, the result of test executed with the application direction of the transferring magnetic field within the aforementioned range will be explained. The master medium, the slave medium and the magnetic transfer method used in the test are as following.

(Preparation of Master Medium)

By Ni stamper method, a Ni substrate having disk-shaped patterns of 0.2 μm depth was prepared, wherein the patterns have radial lines with equal interval and width of 0.5 μm within a range of 20~40 mm from center of the disk to in the radial direction and the line interval is 0.5 μm at the innermost position which is 20 mm distant radially from the center of the disk. In the vacuum film growth apparatus, under conditions that pressure was decreased to $1.33 \times 10^{-5}$ Pa($10^{-7}$ Torr) at room temperature and then argon gas was introduced to be 0.4 Pa($3 \times 10^{-3}$ Torr), a FeCo film (soft magnetic layer) having a thickness of 200 nm was formed on the Ni substrate to be the master medium. The coercive force Hcm thereof was 8 kA/M (100 Oe), and the magnetic flux density Ms was 28.9 T (23000 Gauss).

(Preparation of Slave Medium)

In the vacuum film growth apparatus, under conditions that pressure was decreased to $1.33 \times 10^{-5}$ Pa($10^{-7}$ Torr) at room temperature and then argon gas was introduced to be 0.4 Pa($3 \times 10^{31~3}$ Torr), a glass plate was heated to 200° C. to prepare a magnetic recording medium (hard disk) having a disk shape of 3.5 inch type in which CrTi was 60 nm thick, CoCrPt was 25 nm thick, the magnetic flux density Ms was 5.7 T (4500 Gauss) and the coercive force Hcs was 199 kA/M (2500 Oe).

(Test Method for Magnetic Transfer)

The ring type head electromagnet shown in FIG. 1 was arranged so that the peak of the magnetic field intensity was 398 kA/m (5000 Oe), which is 2 times the coercive force Hcs of the slave medium, on the surface of the slave medium, to initially DC magnetize the slave medium. Next, the slave medium initially DC magnetized and the master medium was brought into close contact with each other and current of the ring type head electromagnet was regulated so that the peak of the magnetic field intensity was 207 kA/m (2600 Oe) on the surface of the slave medium.

In the application angle of the magnetic field (peak magnetic field) by the upper and lower electromagnets, the magnetic field was applied in a direction reverse to the application direction at the initial D.C. magnetization while the angle α in the vertical direction shown in FIG. 2 was varied in a range of 0°~±45° and the angle β in the track direction shown in FIG. 3 was varied in a range of 0°~±45°, to execute the magnet transfer. Also, close contact of the master medium and the slave medium was performed by means of pressing an aluminum plate with a rubber plate inserted.

(Evaluation Method of Electromagnetic Conversion Property)

The transferring signal of the slave medium was evaluated by means of an apparatus for measuring electromagnet conversion property (SS-6 produced by Kyoto Denshi Ltd.). An MR head in which gap of a reproduction head was 0.24 μm, width of a reproduction track was 1.9 cm, gap of a recording head was 0.4 μm and width of a recording track was 2.4 μm was used as the head. The read-out out signal was frequency-divided by a spectrum-analyzer and difference (C/N) between the peak intensity C of the first signal and noise N of the medium fitted from outside was measured. The relative value ΔC/N was evaluated while the value when the angle α and the angle β were all 0° (that is, α=β=0°) was 0dB. Because when the relative value ΔC/N got less than −6 dB (greater in the minus direction), the signal intensity was small and the transfer got bad, the value was evaluated as a permitted value. The result is shown in table 1 and table 2.

TABLE 1

| β | C/N (dB) | | | | | | | | | |
|---|---|---|---|---|---|---|---|---|---|---|
| 45° | −9.2 | −9.5 | −9.6 | −10.0 | −10.3 | −10.7 | −11.1 | −13.8 | −17.1 | −19.6 |
| 40° | −8.1 | −8.9 | −9.1 | −8.9 | −9.1 | −9.7 | −10.5 | −12.5 | −14.1 | −16.9 |
| 35° | −6.3 | −7.7 | −7.4 | −8.7 | −8.9 | −9.1 | −9.5 | −10.9 | −13.5 | −14.7 |
| 30° | −2.7 | −7.1 | −7.1 | −8.3 | −8.7 | −8.5 | −9.1 | −9.7 | −13.1 | −14.5 |
| 25° | −1.9 | −2.7 | −6.5 | −7.1 | −8.1 | −8.4 | −8.9 | −11.1 | −12.7 | −14.1 |

TABLE 1-continued

| β | | | | | C/N (dB) | | | | | |
|---|---|---|---|---|---|---|---|---|---|---|
| 20° | −1.3 | −1.7 | −2.7 | −6.8 | −7.8 | −8.1 | −8.5 | −9.1 | −9.5 | −10.4 |
| 15° | −0.5 | −1.2 | −1.9 | −2.7 | −7.1 | −7.5 | −8.1 | −8.3 | −8.9 | −9.1 |
| 10° | −0.2 | −0.4 | −1.5 | −1.9 | −2.8 | −6.4 | −7.4 | −7.9 | −8.3 | −8.9 |
| 5° | −0.1 | −0.2 | −0.7 | −1.8 | −2.1 | −2.5 | −6.9 | −7.1 | −8.1 | −8.7 |
| 0° | 0 | −0.2 | −0.2 | −0.9 | −1.5 | −2.1 | −2.8 | −6.7 | −7.2 | −8.5 |
| | 0° | 5° | 10° | 15° | 20° | 25° | 30° | 35° | 40° | 45° |
| | | | | | α | | | | | |

TABLE 2

| β | | | | | C/N (dB) | | | | | |
|---|---|---|---|---|---|---|---|---|---|---|
| 45° | −9.3 | −9.7 | −10.1 | −10.5 | −10.8 | −11.2 | −11.3 | −14.3 | −17.4 | −19.1 |
| 40° | −8.7 | −9.1 | −8.9 | −9.5 | −9.9 | −10.1 | −10.8 | −11.9 | −15.1 | −17.6 |
| 35° | −7.1 | −8.7 | −8.6 | −9.1 | −9.3 | −9.7 | −10.1 | −11.3 | −11.9 | −13.8 |
| 30° | −2.8 | −7.9 | −8.3 | −8.1 | −8.4 | −8.3 | −9.3 | −9.7 | −10.5 | −11.1 |
| 25° | −2.1 | −2.8 | −6.9 | −7.1 | −7.4 | −7.9 | −8.1 | −9.8 | −9.9 | −10.8 |
| 20° | −1.5 | −2.4 | −3.0 | −6.3 | −6.8 | −7.4 | −7.9 | −8.9 | −9.1 | −9.5 |
| 15° | −0.9 | −1.4 | −1.6 | −2.7 | −6.4 | −6.7 | −7.5 | −8.2 | −8.8 | −9.6 |
| 10° | −0.3 | −0.5 | −0.9 | −2.5 | −3.1 | −6.7 | −7.3 | −7.7 | −8.5 | −9.1 |
| 5° | −0.1 | −0.3 | −0.4 | −2.1 | −2.3 | −3.1 | −6.7 | −7.1 | −7.9 | −8.4 |
| 0° | 0 | −0.1 | −0.3 | −1.0 | −1.9 | −2.1 | −2.7 | −7.0 | −7.9 | −8.8 |
| | −0° | −5° | −10° | −15° | −20° | −25° | −30° | −35° | −40° | −45° |
| | | | | | α | | | | | |

Also, Table 1 shows values when the angle α and the angle β all were varied in plus directions, and Table 2 shows values when the angle α was varied in the negative direction and the angle β was varied in the plus direction. The plus direction of the angle α is the direction in which lines of magnetic force are inclined upward with respect to a close-contact surface of the slave medium and the master medium so as to proceed toward the slave medium, and the direction inclined downward is the minus direction. The plus direction of the angle β is the direction in which lines of magnetic force are inclined toward the outer circumference with respect to a tangent line of the track on the close contact surface of the slave medium and the master medium, and the direction inclined toward the inner circumference is the minus direction. Also, because data when the angle β in the plane track direction was varied is approximately equal to each other in the plus direction and in the minus direction, data in the minus direction were omitted.

As shown in Table 1 and Table 2, when the angle β was 0°, good magnetic transfer could be performed if the angle α was within a range of ±30°~−30°. Similarly, when the angle α was 0°, good magnetic transfer could be performed if the angle β was within a range of +30°~−30° (minus values were not shown but were equal to plus values). Also, when any one of the angle α and the angle β got greater in the plus direction or the minus direction, a good range of the relative value ΔC/N was in a range in which absolute value of the other one was smaller than 30°. A good magnetic transfer could be performed within a range surrounded with a thick ruled line in which sum of the absolute values of both angles α and β was smaller than 30°.

What is claimed is:

1. A magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of:

providing a magnetic generating device that is rotatably mounted on a magnetic transfer apparatus;

applying a magnetic field to the slave medium in a track direction of a slave surface to initial DC magnetize the slave medium previously in the track direction;

bringing the master medium and the slave medium into close contact with each other; and applying the transferring magnetic field generated by the magnetic generating device in the track direction of a slave surface to execute a magnetic transfer, wherein an application angle α of the transferring magnetic field is inclined $0 \leq \alpha \leq 30°$ or $-30° \leq \alpha \leq 0$ with respect to the slave surface, and wherein an application angle β of the transferring magnetic field is $0 \leq \beta \leq 30°$ or $-30° \leq \beta \leq 0$ with respect to the track direction on a plane parallel to the slave surface.

2. The method of claim 1, wherein the magnetic transfer copies the information on the surface of the master medium to the slave medium.

3. The method of claim 1, wherein the track direction is a tangential to a circumferential track on the slave surface.

4. A magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of:

applying a magnetic field to the slave medium in a track direction of a slave surface to initial DC magnetize the slave medium previously in the track direction;

bringing the master medium and the slave medium into close contact with each other; and applying the transferring magnetic field in the track direction of a slave surface to execute a magnetic transfer, wherein an application angle β of the transferring magnetic field is 0<β≦30° or −30°≦β<0 with respect to the track direction on a plane parallel to the slave surface.

5. The method of claim 4, wherein the magnetic transfer copies the information on the surface of the master medium to the slave medium.

6. The method of claim 4, wherein the track direction is a tangential to a circumferential track on the slave surface.

7. A magnetic transfer method for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, comprising the steps of:

provided a magnetic generating device that is rotatably mounted on a magnetic transfer apparatus;

applying a magnetic field to the slave medium in a track direction of a slave surface to initial DC magnetize the slave medium previously in the track direction;

bringing the master medium and the slave medium into close contact with each other; and applying the transferring magnetic field generated by the magnetic generating device in the track direction of a slave surface to execute a magnetic transfer, wherein a sum of absolute values of an application angle α of the transferring magnetic field that is inclined with respect to the slave surface and an application angle β of the transferring magnetic field with respect to the track direction on a plane parallel to the slave surface is greater than 0 and less than or equal to 30°, and wherein the application angle β is 0≦β≦30° or −30°≦β≦0.

8. The method of claim 7, wherein the magnetic transfer copies the information on the surface of the master medium to the slave medium.

9. The method of claim 7, wherein the track direction is a tangential to a circumferential track on the slave surface.

10. A magnetic transfer apparatus for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, which comprises:

a magnetic field generating device that applies the transferring magnetic field to the slave medium in close contact with the master medium in a track direction, wherein an application angle α of the transferring magnetic field by the magnetic field generating device is inclined 0≦α≦30° or −30°≦α≦0 with respect to a slave surface, and wherein an application angle β of the transferring magnetic field by the magnetic field generating device is 0≦β≦30° or −30°≦β≦0 with respect to the track direction on a plane parallel to the slave surface.

11. The apparatus of claim 10, wherein the magnetic transfer copies the information on the surface of the master medium to the slave medium.

12. The apparatus of claim 10, wherein the track direction is a tangential to a circumferential track on the slave surface.

13. A magnetic transfer apparatus for applying a transferring magnetic field in a state that a master medium for magnetically transferring in which a magnetic layer is formed in a portion corresponding to information signals on a surface of a substrate, and a magnetic recording medium which is a slave medium for being magnetically transferred, are in close contact with each other, which comprises:

a magnetic field generating device that applies the transferring magnetic field to the slave medium in close contact with the master medium, wherein the magnetic generating device is rotatably mounted on the magnetic transfer apparatus such that an application angle α of the transferring magnetic field by the magnetic field generating device is adjustable within a range of ±30° with respect to a slave surface on a plane perpendicular to the slave surface, and an application angle β of the transferring magnetic field by the magnetic field generating device is adjustable within a range of ±30° with respect to the track direction on a plane parallel to the slave surface.

* * * * *